United States Patent [19]

Lavene

[11] Patent Number: 4,470,097
[45] Date of Patent: Sep. 4, 1984

[54] DUAL FILM METALLIZED CAPACITOR

[75] Inventor: Bernard Lavene, Ocean, N.J.

[73] Assignee: Electronic Concepts, Inc., Eatontown, N.J.

[21] Appl. No.: 459,794

[22] Filed: Jan. 21, 1983

[51] Int. Cl.³ .............................................. H01G 1/015
[52] U.S. Cl. .................................................... 361/304
[58] Field of Search ........................ 361/273, 303–315, 361/323, 324

[56] References Cited

U.S. PATENT DOCUMENTS

| 3,380,136 | 4/1968 | Wydro | 361/304 X |
| 3,457,478 | 7/1969 | Lehrer | 361/307 X |
| 3,644,805 | 2/1972 | Heywang | 361/304 |
| 3,836,830 | 9/1974 | Akopian et al. | 361/273 X |

FOREIGN PATENT DOCUMENTS 931478 8/1955 Fed. Rep. of Germany ...... 361/304

Primary Examiner—Donald A. Griffin
Attorney, Agent, or Firm—Ratner & Prestia

[57] ABSTRACT

A metallized wound capacitor having a pair of elongated dielectric webs with a first electrode metallized on a first face of each dielectric web. The first electrodes extend from opposing longitudinal edges leaving respective bare margins of the dielectric webs along opposing edges. Each of the dielectric webs also has a second electrode metallized on a second face and opposing the respective bare margin. Each second electrode has a width which is substantially no greater than the respective bare margin. In this manner, each second electrode does not extend in an opposing relationship with its respective first electrode.

6 Claims, 4 Drawing Figures

DUAL FILM METALLIZED CAPACITOR

BACKGROUND OF THE INVENTION

1. Field of the Invention

This invention relates to metallized dielectric wound capacitors and more particularly to wound capacitors in which each dielectric web is metallized on both sides.

2. Background Art

In making wound capacitors and particularly pulse and AC wound capacitors, a critical problem has been in forming the lead termination. The ends of the wound capacitor have been sprayed with molten metal particles to form terminals engaging the electrodes metallized on the dielectric web. Leads have then been bonded to the terminals. In order to decrease the ESR (equivalent series resistance), decrease the dissipation factor and increase the reliability of the connection between the metallization and the spray, it has been crucial to have a substantial amount of metallization defined at the capacitor end, since it is such metallization which is in electrical connection with the metal spray. The art has sought a high quality connection with as low resistance as possible. This is particularly important with thin film dielectrics and low voltage capacitors requiring low losses and low ESR.

In order to assure at least one thickness of metallization at each capacitor end the dielectric webs have been offset one from the other. This has been particularly important in view of material distortion or irregularity and travel of one dielectric web with respect to the other as a result of irregularities in the winding process caused, for example, by machine wear. The dielectric webs have been offset so that each metallized edge extends outwardly. Accordingly, even if the winding machine causes a major amount of irregularity there would still be an exposed edge of metallization at the capacitor end. However, such offset is objectionable when making small sized wound capacitors, since it substantially decreases the volumetric efficiency of the capacitor. A conventional offset can increase the size of such capacitors by approximately 20%.

It has been known to provide wound capacitors with each dielectric web metallized on both sides. Capacitors having various forms of dual metallization are described in the following U.S. Patents:

U.S. Pat. Nos. 4,012,817, 4,037,298, 3,179,862, 2,226,589, 3,435,308, 4,064,606, 2,887,649, 2,919,390, 3,348,284, 3,317,983, 3,178,623, 3,857,074, 3,581,167, 3,851,363.

Wound capacitors having dual metallization substantially provide double the surface area in contact with the metal spray which increases the reliability of the connection and also reduces the ESR of the capacitor. However, such dual metallization has left much to be desired in view of undesirable metal shorts which form between the metallized webs by way of pinholes in the dielectric web. Specifically the pinholes fill with metal which formed a connection path or short between the two metallized electrodes which connection path must be cleared. Such a clearing process is accomplished by applying a high voltage to the electrodes across the pinhole so that the metal therein burns and vaporizes away. However, such high voltage clearing process has been unacceptably expensive and produces undesirable contamination and burning of the dielectric. Further, clearing may not even be possible if the voltage rating of the dielectric is not of sufficiently high values.

Accordingly, an object of the present invention is a wound capacitor in which each dielectric web is metallized on both sides and does not require clearing.

Another object of the invention is a wound capacitor having dielectric webs metallized on both sides which are not offset one from the other in the winding process yet permitting sufficient exposed metallization even if the webs wander during the winding process or there is film distortion.

SUMMARY OF THE INVENTION

A metallized wound capacitor comprising a pair of elongated dielectric webs each having first and second faces with a first electrode metallized on each first face. Each of the first electrodes is of width less than its respective dielectric web and extends from opposing web longitudinal edges leaving respective bare margins on the web. Each of the dielectric webs has a second electrode metallized on a second face and only opposes the respective bare margin. Each second electrode has a width substantially no greater than their respective bare margin so that each second electrode does not extend in an opposing relationship with its respective first electrode. The dielectric webs are convolutely arranged in a capacitor roll with the electrodes in superposed relation to each other.

DETAILED DESCRIPTION OF THE INVENTION

Figure 1:
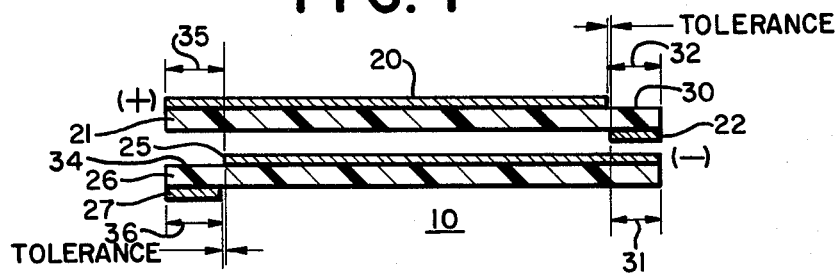
FIG. 1 is a diagramatic side elevational view of the capacitor forming non offset strips in unrolled and separated relation according to the invention.

Referring now to FIG. 1, a nonoffset capacitor 10 is shown comprising a first elongated dielectric web 21 having an electrode 20 metallized on an upper face thereof. A second elongated dielectric web 26 is aligned with and is of the same width as web 21 and also has an electrode 25 metallized on an upper face thereof. Electrodes 20 and 25 are of less width than that of webs 21 and 26 and extend from one longitudinal edge thereof leaving respective safe edges or bare margins 30, 34 of the web along opposite edges thereof. Electrode 20 extends from the left edge of web 21 and electrode 25 extends from the right edge of web 26.

In a preferred embodiment, electrodes 20, 25 are of equal width as are bare margins 30, 34. Margin 30 has a width 32 which together with the width of electrode 20 equals the total width of web 21. Similarly, margin 34 has a width 35 which together with the width of electrode 25 equals the total width of web 26.

As shown in FIG. 1, the metallized webs 21 and 26 are disposed in superposed relation to each other with the bare margins 30, 34 respectively disposed at opposite edges of the superposed webs. Dielectric web 21 is dual metallized by means of a second substantially thin width electrode 22 metallized on its lower face only directly below margin 30. Electrode 22 extends from the right longitudinal edge of web 21 which is opposite to that edge to which electrode 20 extends. Electrode 22 is of width 31 which is equal to width 32 less a manufacturing tolerance determined by the capabilities of the metallized film converters. Therefore, in the manufacturing process, even if layer 22 extends to its maximum tolerance width, no portion of layer 22 would be formed under (opposing relationship with) electrode 20. It will be understood by those skilled in the art that in the manufacturing process that the tolerance may be exceeded in some few cases and electrode 22 may undesirably extend under electrode 20.

Similarly, dielectric web 26 has a second electrode 27 metallized on a lower face thereof only directly below bare margin 34. Layer 27 extends from the longitudinal edge (left edge) remote to that edge from which electrode 25 extends. Electrode 27 is of width 36 which is equal to width 35 of margin 34 less the manufacturing tolerance, so that substantially no portion of the area of electrode 27 extends below electrode 25.

Figure 3:
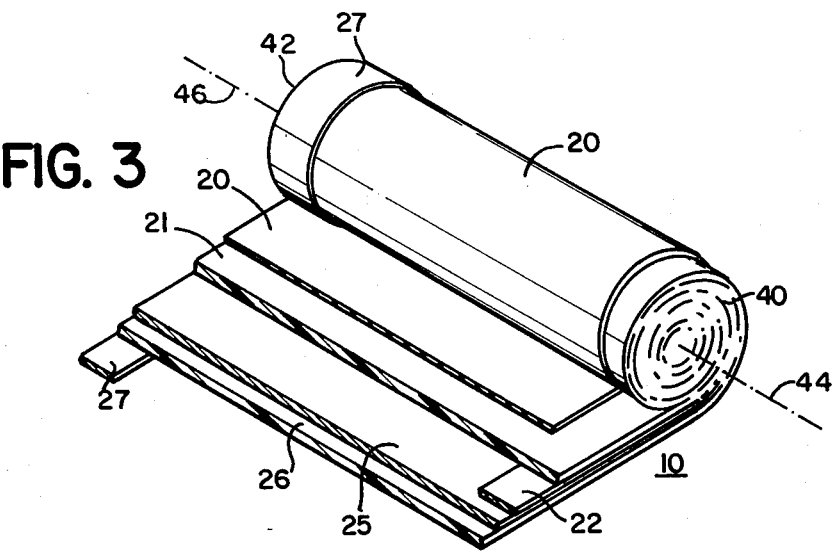
FIG. 3 is a perspective view of the capacitor forming strips as shown in FIG. 1 partially wound into a capacitor roll.

It will now be understood that since the lower electrodes 22, 27 do not extend below their respective upper electrode layers 20, 25 that there is avoided the requirement for high voltage clearing between the respective upper and lower electrodes. In accordance with the invention as a result of having a greater surface exposed to the metal spray, there is a higher probability of excellent lead termination when the terminals are formed which produces minimum ESR and minimum dissipation factor. For example, on completion of the winding of the metallized webs into a capacitor roll as best shown in FIG. 3, electrodes 22 and 25 engage and act as an effective single conductor to provide twice the surface area of the metal spray. Similarly, on rolling, electrodes 20 and 27 provide twice the effective surface area. Thus, all of the electrodes may be made as thin (transverse dimension) as possible.

On completion of the winding of capacitor row 10 as shown in FIG. 3, the ends may be sprayed with a high velocity mixture of compressed air and molten fine particles of tin produced from an electric arc gun. This spray forms terminal 40 in contact with electrodes 22 and 25 and terminal 42 in contact with electrodes 27 and 20. In conventional manner leads 44 and 46 may then be respectively bonded to terminal 40 and 42.

It will now be understood by those skilled in the art that during the winding process, even though webs 21, 26 are not offset prior to winding and even if there is travel of these webs as a result of machine inconsistencies or film distortion, there will always be on each end of the capacitor exposed metallization. For example, if web 21 wanders to the right with respect to web 26, then metallized electrode 22 is exposed at the right end so that there is a connection between sprayed terminal 40 and electrode 22 which electrically connects to electrode 25. It is necessary that the dimension of width 31 be such that the maximum value of such travel is no greater than that dimension. It will further be understood that if the material wander is such that web 26 wanders to the right with respect to web 21 then electrode 25 is exposed at the right end and is directly in contact with metal spray terminal 40. The above description applies equally to the left end of capacitor 10 in which a wandering of web 26 to the left would expose electrode 27 and a wandering of web 21 to the left would expose electrode 20. Dimension 36 is also related to the maximum travel as above described. Thus, in accordance with the present invention, nonoffset wound capacitor 10 provides an increased volumetric efficiency while still permitting sufficient exposed metallization for proper termination even if the film is distorted or the material wanders during winding. It is in this way that the volumetric efficiency is increased by the amount of reduction in offset.

In view of the above, it will now be understood that in a further embodiment of the invention, width 31 of electrode 22 is less than width 32 of the safe edge less the tolerance. Specifically, width 31 of electrode 22 may be only sufficient to meet any irregularities due to the winding machine or film distortion. Thus, even though width 31 is substantially narrower than width 32 (less the tolerance), and web 21 wanders to the right, for example, electrode 22 would still contact electrode 25 and accept spray terminal 40 thereby providing an effective capacitor connection. The foregoing also applies to width 36 of electrode 27 being substantially less than margin width 35 less the tolerance.

Figure 2:
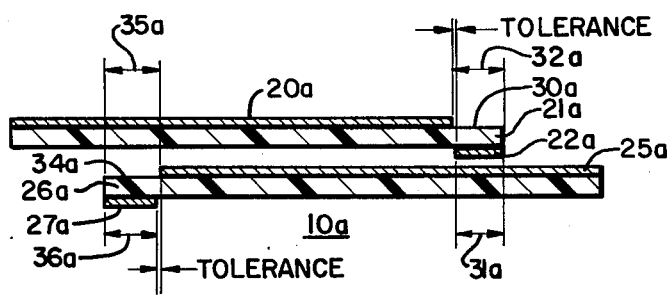
FIG. 2 is a diagramatic side elevational view of the capacitor forming offset strips in unrolled and separated relation according to another embodiment of the invention.

Referring now to FIG. 2 there is shown an embodiment of the invention directed to capacitors 10a, which do not require high volumetric efficiency such as AC capacitors having wide dielectric webs 21a, 26a. In FIG. 2, items similar to those in FIG. 1 have been identified with the same reference numeral plus a suffix. In such wide web capacitors, reduced offset is not an advantage and thus the offset as shown in FIG. 2 allows the spray forming terminal 40, 42 to become embedded deeper between the individual layers of dielectric webs 21a, 26a for better contact and a more tenacious bond to the spray. Specifically, offset wound capacitor 10a comprises a first elongated dielectric web 21a having an upper electrode 20a and a second elongated dielectric web 26a having an upper electrode 25a. Lower electrodes 22a and 27a have been formed as previously described. Web 21a is offset laterally to the left with respect to web 26a so that on completion of the winding, marginal portions of electrodes 25a, 20a are accessible at right and left ends of the roll. On completion of the winding of the metallized webs into a capacitor roll there are formed gaps between the layers so that the ends are effectively semiporous. When spray enters at the right end, for example, it tenaciously contacts each metallization electrode 25a which extends to the right of electrode 22a and also contacts the edge of electrode 22a. It is in this way that electrode 22a combines with electrode 25a in providing a more reliable connection to the spray and electrode 27a combines with electrode 20a.

Figure 4:
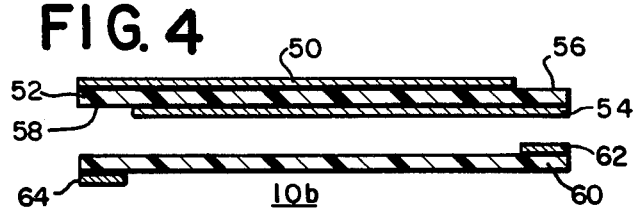
FIG. 4 is a diagramatic side elevational view of the capacitor forming strips in unrolled and separated relation of still another embodiment of the invention.

A further embodiment is shown in FIG. 4 in which a capacitor 10b comprises a first elongated dielectric web 52 having an electrode 50 metallized on an upper face thereof. Electrode 50 extends from the left longitudinal edge of web 52 leaving a right safe edge or bare margin 56. A second electrode 54 is metallized on a lower face of web 52 and extends from the right longitudinal edge of web 52 leaving left safe edge or bare margin 58.

It has been known in the art to form a wound capacitor from such a first web 52 with upper and lower metallization 50, 54 together with an unmetallized second web (not shown). However the prior second unmetallized webs have been made narrower than the first metallized web 52 to take into account wandering during the winding process. In this mannar, even if the narrower second web wandered it would still show the metallization which would extend beyond the second web thereby to be reached by the metal spray. In addition, such prior devices have required substantially wide margins 56, 58 in order to assure proper insulation.

In accordance with the further embodiment of the invention, second web 60 is made the same as and is aligned with first web 52. Web 60 has an upper substantially thin width electrode 60 metallized on its upper face directly below margin 56. Electrode 62 extends from the right longitudinal edge of web 60. Web 60 also has a second substantially thin width electrode 64 metallized on its lower face directly below margin 58. Electrode 64 extends from the left longitudinal edge of web 60. Electrodes 62, 64 are preferably about the same width as margins 56, 58 respectively.

Accordingly, in the winding of webs 60, 52 electrode 62 contacts electrode 54 and electrode 64 contacts electrode 50. Thus, even though webs 52, 60 are of the same width, if there is travel between the webs during the winding process, there is always metallization at the respective end of the capacitor 10b. In this manner, to provide a good electrical connection with as low resistance as possible.

Although the present invention has been described with respect to details of contained embodiments thereof, it is not intended that such details be limited upon the scope of the invention.

What is claimed is:

1. A metallized wound capacitor comprising a pair of elongated dielectric webs each having first and second faces with a first electrode metallized on each first face each of said first electrodes being of width less than its respective dielectric web and extending from opposing dielectric web longitudinal edges leaving respective bare margins of the dielectric web along opposing edges thereof, each of said dielectric webs having a second electrode metallized on a second face and only opposing the respective bare margin, each second electrode having a width equal to the opposing bare margin less a manufacturing tolerance so that each second electrode does not extend in an opposing relationship with the respective first electrode, and the dielectric webs being convolutely arranged in a capacitor roll with the electrodes in superposed relation to each other.

2. The metallized wound capacitor of claim 1 in which said dielectric webs are in alignment and non-offset prior to being convolutely arranged in a capacitor roll.

3. The metallized wound capacitor of claim 1 in which the webs are offset one from the other prior to being convolutely arranged in a capacitor roll.

4. The metallized wound capacitor of claim 1 in which there are provided terminals formed by metal spray at the ends of the capacitor roll in contact with the respective first electrode of one web and second electrode of the other web.

5. A metallized capacitor comprising at least one elongated dielectric web having first and second faces with a first electrode metallized on a first face thereof, said first electrode being of width less than that of the dielectric and extending from one longitudinal edge leaving a bare margin adjacent the other edge of the dielectric web, said dielectric web having a second electrode metallized on a second face and only opposing the bare margin, the second electrode has a width substantially equal to the opposing bare margin less a manufacturing tolerance whereby the second electrode is free of an opposing relationship with the first electrode.

6. A metallized wound capacitor comprising a first and a second elongated dielectric web each having first and second faces, said first and second dielectric webs being of the same width and aligned with each other, said first dielectric web having a first electrode metallized on a first face thereof and a second electrode metallized on a second face thereof, said first and second electrodes each being of width less than that of the dielectric and extending from opposing longitudinal edges leaving opposing bare margins on the dielectric web, said second dielectric web having a first electrode metallized on a first face thereof directly below the bare margin on the first face of said first dielectric web, a second electrode metallized on a second face of said second dielectric web directly opposing the other bare margin, the first and second electrodes of the second dielectric web having widths substantially equal to their respective opposing bare margins less manufacturing tolerances and, the dielectric webs being convolutely arranged in a capacitor roll with the electrodes in superposed relation to each other.

* * * * *